US008301515B2

(12) United States Patent
Chowdhary et al.

(10) Patent No.: US 8,301,515 B2
(45) **Date of Patent: *Oct. 30, 2012**

(54) METHOD AND SYSTEM FOR EVALUATING PRODUCT SUBSTITUTIONS ALONG MULTIPLE CRITERIA IN RESPONSE TO A SALES OPPORTUNITY

(75) Inventors: Pawan R. Chowdhary, Montrose, NY (US); Thomas Robert Ervolina, Poughquag, NY (US); Markus Ettl, Ossining, NY (US); Young Min Lee, Old Westbury, NY (US); Daniel John Peters, Poughquag, NY (US); Anshul Sheopuri, Hartsdale, NY (US); Karthik Sourirajan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,933

(22) Filed: Feb. 14, 2012

(65) Prior Publication Data

US 2012/0150682 A1 Jun. 14, 2012

Related U.S. Application Data

(63) Continuation of application No. 12/181,070, filed on Jul. 28, 2008, now Pat. No. 8,195,527.

(51) Int. Cl.
*G06Q 30/00* (2006.01)

(52) U.S. Cl. ...................................... 705/26.7; 705/27.1

(58) Field of Classification Search ......... 705/26.1–27.2
See application file for complete search history.

(56) References Cited

U.S. PATENT DOCUMENTS

| | | | |
|---|---|---|---|
| 6,930,060 B2 | 8/2005 | Chou | |
| 7,233,914 B1 | 6/2007 | Wijaya et al. | |
| 2001/0021914 A1 | 9/2001 | Jacobi et al. | |
| 2004/0024628 A1 | 2/2004 | Eck et al. | |
| 2006/0173728 A1 | 8/2006 | An | |
| 2007/0073587 A1 * | 3/2007 | Walker et al. | 705/14 |

OTHER PUBLICATIONS

FastSearch & Transfer: Fast Delivers First Complete Platform for Next- generation, Personalized Storefronts; First eCommerce Vendor to Combine Personalized Recommendations with Leading Site Search, Navigation & Merchandising. (Sep. 17). M2 Presswire,1. Retrieved Jun. 9, 2012, from ProQuest Newsstand. (Document ID: 1337079211).*

Yunes, Tallys H., et al, Building Efficient Product Portfolios at John Deere and Company, Operations Research, Jul.-Aug. 2007, pp. 615-269, vol. 55, No. 4.

Wand, Revolution, May 2008, pp. 27, ISSN: 1460-5953.

* cited by examiner

*Primary Examiner* — Jeffrey A Smith
*Assistant Examiner* — Resha Desai
(74) *Attorney, Agent, or Firm* — Scully, Scott, Murphy & Presser, P.C.; Daniel P. Morris, Esq.

(57) ABSTRACT

A system and method evaluate product substitutions along multiple criteria in response to a sales opportunity, for instance, providing sales recommendations of configurable products in response to a customer request based on propensity functions. A customer propensity is determined to estimate attractiveness of a substitute product to a customer based on one or more attributes. A seller propensity is determined to estimate attractiveness to a seller of selling the substitute product based on one or more attributes. The customer propensity and the seller propensity are combined to find a plurality of substitute products.

20 Claims, 4 Drawing Sheets

METHOD AND SYSTEM FOR EVALUATING PRODUCT SUBSTITUTIONS ALONG MULTIPLE CRITERIA IN RESPONSE TO A SALES OPPORTUNITY

CROSS REFERENCE TO RELATED APPLICATION

This application is a continuation of U.S. patent application Ser. No. 12/181,070, filed Jul. 28, 2008, the entire content of which is incorporated herein by reference.

FIELD OF THE INVENTION

The present application relates to managing products for sales and offerings, more particularly to evaluating product substitutions along multiple criteria in response to a sales opportunity.

BACKGROUND OF THE INVENTION

Many sellers provide a broad spectrum of product configuration options with their product offerings, and allow a customer to individually configure desired options when buying the products. While such capability can provide flexibility in purchasing transactions, with so many options, the shopping customer must search over each configuration to find the product that best meets the customer's preferences. To the customer, this can be a daunting and time-consuming task. The difficulty is compounded when the querying and searching for the available products and their options involve web-based lookups. Often customers give up and look elsewhere. This results in lost sales for the seller.

The sellers usually are interested in promoting products that they can supply easily and are profitable. To date, there is no known methodology—for intelligently determining personalized sales recommendations for the substitutes to configurable or configured products—which concurrently takes into account both the customer preferences and the seller's interests.

BRIEF SUMMARY OF THE INVENTION

A system and method that evaluate product substitutions along multiple criteria in response to a sales opportunity are provided. The method in one aspect may comprise determining a customer propensity to estimate attractiveness of a product offering to a customer based on one or more first attributes, and determining a seller propensity to estimate attractiveness to a seller of selling the product offering based on one or more second attributes. The customer propensity and the seller propensity are combined to find a list of a plurality of substitute product recommendations.

A system for evaluating product substitutions along multiple criteria in response to a sales opportunity, one aspect, may comprise a data storage module operable to store at least product data, customer propensity attributes and weights, and seller propensity attributes and weights. A processing engine module may be operable to determine customer propensity and seller propensity, and propensity rankings associated with each of a plurality of products. The processing engine module may be further operable to generate one or more product recommendations.

A program storage device readable by a machine, tangibly embodying a program of instructions executable by the machine to perform above-described method may be also provided.

Further features as well as the structure and operation of various embodiments are described in detail below with reference to the accompanying drawings. In the drawings, like reference numbers indicate identical or functionally similar elements.

DETAILED DESCRIPTION

A method and system are disclosed for providing sales recommendations in response to a customer request based on multi-attribute propensity functions. A customer propensity may be computed to estimate the attractiveness of a product offering to a customer, based on one or more attributes, e.g., availability, price, utility of the configuration to meet customer needs, green factor, etc. A seller propensity may be also computed to estimate the attractiveness to the seller of selling a specific product offering, based on one or more attributes, e.g., profitability, supply/demand balance (excess versus constrained), serviceability, green factor, etc. Green factor refers to an indicator for environmentally favorable products based on material types and energy consumption. Customer propensity and seller propensity may be combined to determine an alternative product offering that positively influences the buyer's decisions during the sales process.

Figure 1:
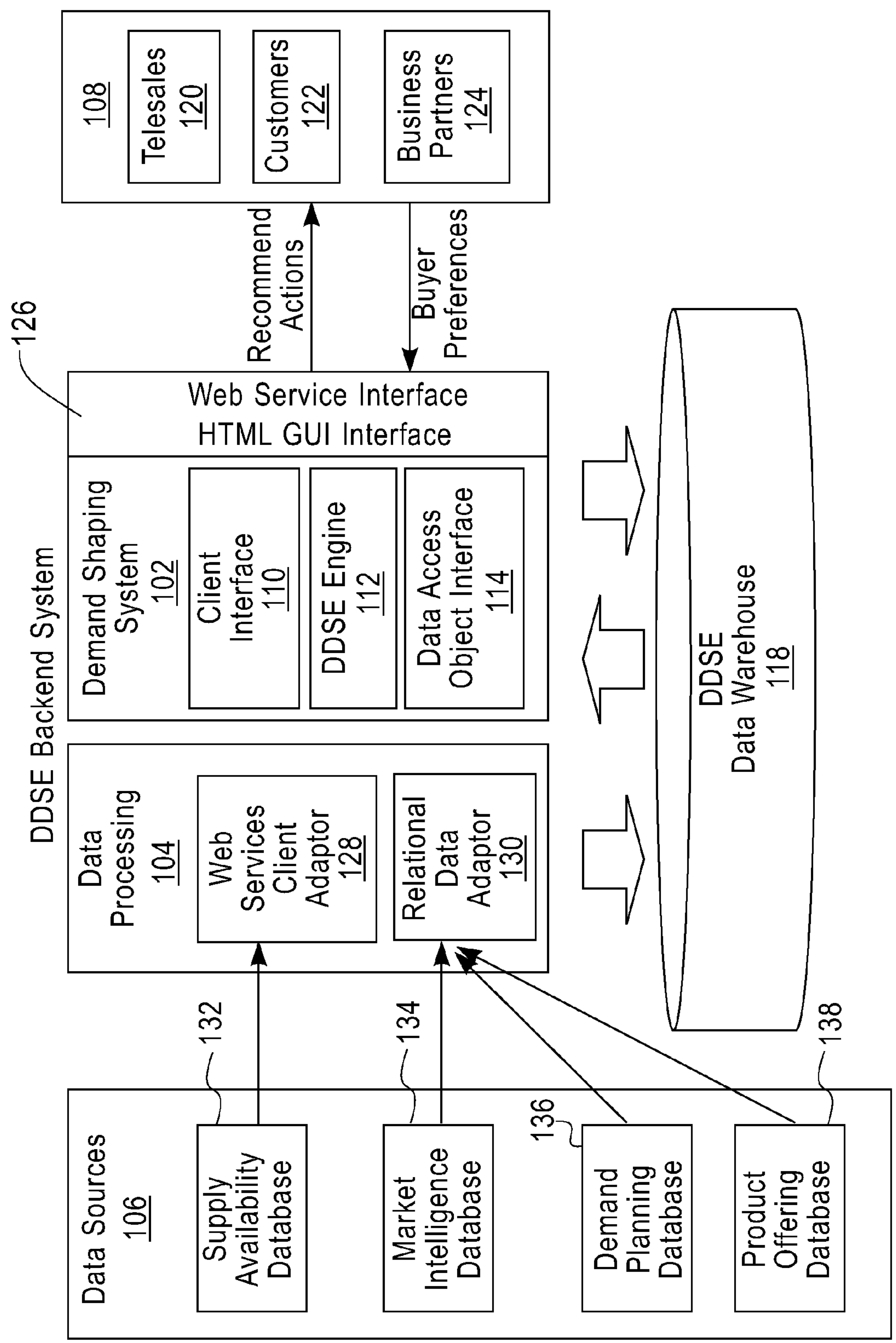
FIG. 1 is an architectural diagram illustrating a system that implements a dynamic demand shaping of the present disclosure in one embodiment.

FIG. 1 is an architectural diagram illustrating a system that implements a dynamic demand shaping system of the present disclosure in one embodiment. The functional components or modules shown in FIG. 1 illustrate examples of the functionalities that may be implemented to perform a method in one embodiment of evaluating product substitutions along multiple criteria. Other functional or modular configurations may be utilized.

Demand shaping system 102 may comprise a client interface for interacting with user interfaces and users 108, for example, on the seller and/or buyer sides such as telesales marketers 120, customer 122, and business partners 124. There may be a client interface module 110 that provides a programming interface to web services interface and/or hypertext markup language (HTML) graphical user interface (GUI) interface 126 for interacting with World Wide Web (web) enabled applications. DDSE engine 112 determines a list of a plurality of substitute products, for instance, based on a plurality of attributes and/or parameters. DDSE engine is further described with reference to FIG. 2 below. Data Access Object Interface module 114 provides interface and/or data exchange capabilities between one or more data warehouses, for example, DDSE data warehouse 118, and one or more modules in the DDSE system.

In one embodiment, a data processing module 104 processes various sources of data 106 for use by the demand shaping system 102. A web services client adaptor 128 delivers data via web-enabled applications. A relational data adaptor 130 formats or otherwise processes the data into a predetermined or common format for storage into the data warehouse 118. The data processed by the demand shaping system 102 may include, but is not limited to, data from a supply availability database 132, market intelligence database 134, demand planning database 136, and product offering database 138. A supply availability database 132 may include information associated with the available supply of products at the seller, for example quantities and lead times for products or components in current or future time periods. Market intelligence database 134 may include customer-centric information such as a record of previous purchases of customers, customer revenue information, customer buying frequency information; it may also provide assignments of individual customers to customer segments. Demand planning database 136 may provide information such as forecast of demands or amount of supply likely needed to meet future demands of customers, etc. Product offering database 138 may include information such as costs, prices, and bills-of-materials of sellable products or components.

Figure 2:
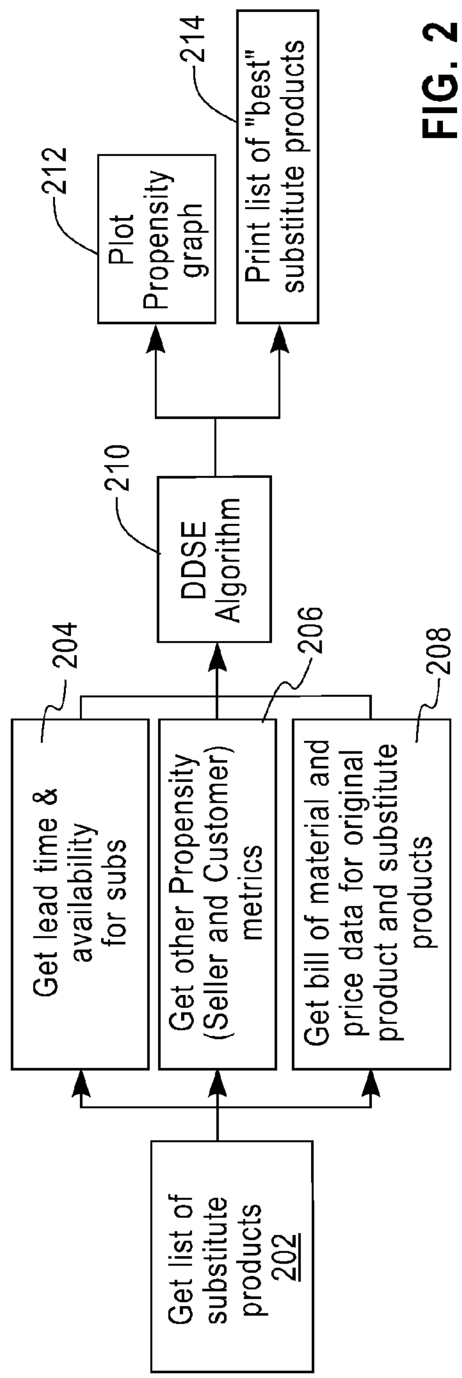
FIG. 2 illustrates a dynamic demand shaping engine of the present disclosure in one embodiment.

FIG. 2. illustrates a dynamic demand shaping engine of the present disclosure in one embodiment. At 202, a list of substitute products are obtained. The substitute products are products that may potentially be substituted for a particular product or products a buyer has selected. At 204, lead time and availability for each of the substitute products on the list are obtained, for instance, using data available from the supply availability database (132 in FIG. 1). At 206, other propensity metrics associated with seller and customer are obtained. Such propensity may include but are not limited to, price, utility of the configuration to meet customer needs, profitability, supply/demand balance, serviceability, etc. At 208, bill of material (BOM) and price data for original product and substitutes are obtained. At 210, an algorithm (e.g., described with reference to FIG. 3) generates one or more product rankings for the substitutes based on customer's preferences and seller's preferences. The results generated at 210 may be presented to the users in various forms, for example visual and/or speech or like, for instance, as a list on a graphical user interface window, and/or using visualization techniques such as propensity plot graphs at 212. A list of "best substitute products" may be generated and printed at 214 based on the algorithm and rankings.

Figure 3:
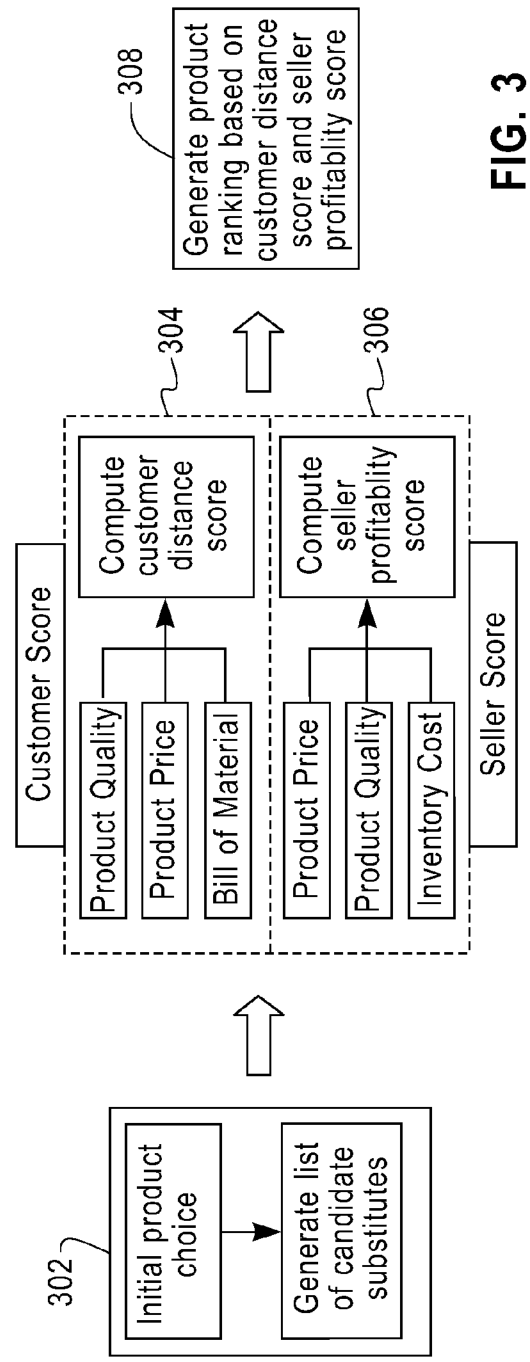
FIG. 3 shows dynamic demand shaping algorithm in one embodiment.

FIG. 3 shows dynamic demand shaping algorithm flow in one embodiment. At 302, initial product choice is obtained from the customer, buyer, etc. For example, a buyer may sign on to the seller's web site or like, or telephone the seller or like to order a product. Based on the initial product choice, a list of candidate substitute products is generated. The list may be generated, for instance, by querying products belonging to the same product family from a product offering database or by querying similar products from a market intelligence database if possible. At 304, customer distance score is computed using parameters associated with the substitute products. The parameters may include quality, price, or bill of material of the substitute product. Product quality may be obtained from the quality of the components used in its bill of material. Customer distance score refers to the propensity or likelihood that a customer will prefer or accept the substitute product in lieu of the initially chosen product. For instance, a score may range from values 0 to 10, with 10 being the highest likelihood that the customer will accept the substitute product and 0 indicating no such likelihood. Customer distance score may be computed for each of the substitutes generated at 302. Parameters used for generating a customer distance score may include, but are not limited to, component quality, i.e., quality of the components needed to make up the substitute product, substitute product price, lead time to obtain the substitute product compared to the original choice, BOM, etc. At 306, seller profitability score is generated, using parameters such as product price, product quality, inventory cost and customer serviceability associated with a transaction. Seller profitability score may be generated for each of the candidate substitutes generated at 302. At 308, using the customer distance score and the seller profitability score, product rankings are generated. Product rankings may be generated for each of the candidate substitutes generated at 302.

In one preferred embodiment, a price sensitivity parameter specifies the maximum price the customer is willing to pay for a product, and a quality sensitivity parameter specifies the minimum quality that a customer expects in a product. Using the initial list of candidate substitute products, substitute products are screened based on their lead time (time for customer to obtain product), and substitute products which have a higher lead time than the customer's initial choice are removed. Substitute products that do not satisfy the price sensitivity or quality sensitivity are also removed. This way, the customer is provided a product with an availability that is no worse than the availability of the customer's initial choice product, and which satisfies the customer's price and quality sensitivity.

As an example, customer distance score may be determined as described further herein. The following notation is introduced in the computation.

j'=original product choice of customer
j=potential substitute
k=commodity group (e.g., hard drives)
i=component (e.g, 60 gigabyte hard drive)
$v_{ij}$=bill-of-materials (BOM) for product j ($v_{ij}$=1 if component i is used in product j, $v_{ij}$=0 otherwise)
$\overline{\upsilon}_j$=vector of BOM $v_{ij}$ for product j
$q_i$=quality of component i
$Q_j$=quality of product j, $$Q_j = \sum_i q_i v_{ij}$$

$P_j$=price of product j
$w_k$=preference of commodity group k
$L_j$=lead time to obtain of product j
$A_j$=Availability of product j ($A_j$>0 if product is in excess, $A_j$<0 if the product is constrained, $A_j$=0 if the product is neither in excess nor constrained)
$h_j$=Cost of carrying excess inventory of one unit of product j
$b_j$=Cost of not satisfying a customer demanding product j The customer distance score, $C_{j,j'}$, can be calculated as $$C_{j,j'} = g(P_j, P_{j'}) - \tau_1 h(Q_j, Q_{j'}) - \tau_2 f(\overline{v}_j, \overline{v}_{j'})$$

$$g(P_j, P_{j'}) = P_{j'} - P_j$$

$$h(Q_j, Q_{j'}) = \sum_k w_k \left[ \max\left\{ \left( \sum_{i \in k} q_i v_{ij'} \right) - \left( \sum_{i \in k} q_i v_i \right), 0 \right\} \right]$$

$$f(\overline{v}_{j'}, \overline{v}_{j'}) = \sqrt{\sum_k w_k \left[ \sum_{i \in k} (v_{ij'} - v_{ij})^2 \right]}$$

$g(P_j, P_{j'})$ captures the price difference between the initial customer choice and the substitute, for instance, requiring that a substitute priced lower than the initial choice is preferable to the customer compared to one that is priced higher. $h(Q_j, Q_{j'})$ ensures that the substitute product does not have a poor quality by penalizing the choice of any component that has a lower quality than that chosen by the customer in the same commodity group. $f(\upsilon_j,\upsilon_{j'})$ ensures that the substitute product has limited changes in configuration compared to the customer's initial choice by penalizing choosing any component in the substitute that is not in the customer's initial choice and by penalizing any component in the customer's initial choice that is absent in the substitute. Combining $g(P_j,P_{j'})$, $h(Q_j,Q_{j'})$ and $f(\upsilon_j,\upsilon_{j'})$ in the same formula using scaling constants, along with a screening based on lead time, ensures that the customer distance score is a multi-attribute function that captures all attributes important to the customer. In the above formulae, $\tau_1$ and $\tau_2$ are scaling/normalization constants that need to be set based on the values of the prices and component qualities. These are required since we are combining attributes that do not have the same unit (e.g.: price may be in US dollars while quality could have a score between 0 and 100). The formula can be extended to include additional attributes.

The seller's profitability score, $\Pi_{j,j'}$, can be generated as shown below.

$$\prod_{j,j'} = s(A_j, A_{j'}) - g(P_j, P_{j'})$$

$$s(A_j, A_{j'}) = \begin{cases} h_j - h_{j'} & A_j, A_{j'} \geq 0 \\ h_j + b_{j'} & A_j \geq 0, A_{j'} \leq 0 \\ -b_j - h_{j'} & A_j \leq 0, A_{j'} \geq 0 \\ -b_j + b_{j'} & A_j, A_{j'} \leq 0 \end{cases}$$

In the above formulae, $s(A_j,A_{j'})$ captures the trade-off between having excess of one product and not satisfying the demand of another product. Subtracting $g(P_j,P_{j'})$ is capturing the fact that it is advantageous to the seller to supply products that generate more revenue than the customer's initial choice product. Because both $s(A_j,A_{j'})$ and $g(P_j,P_{j'})$ are costs, they do not need any scaling constants.

Figure 4:
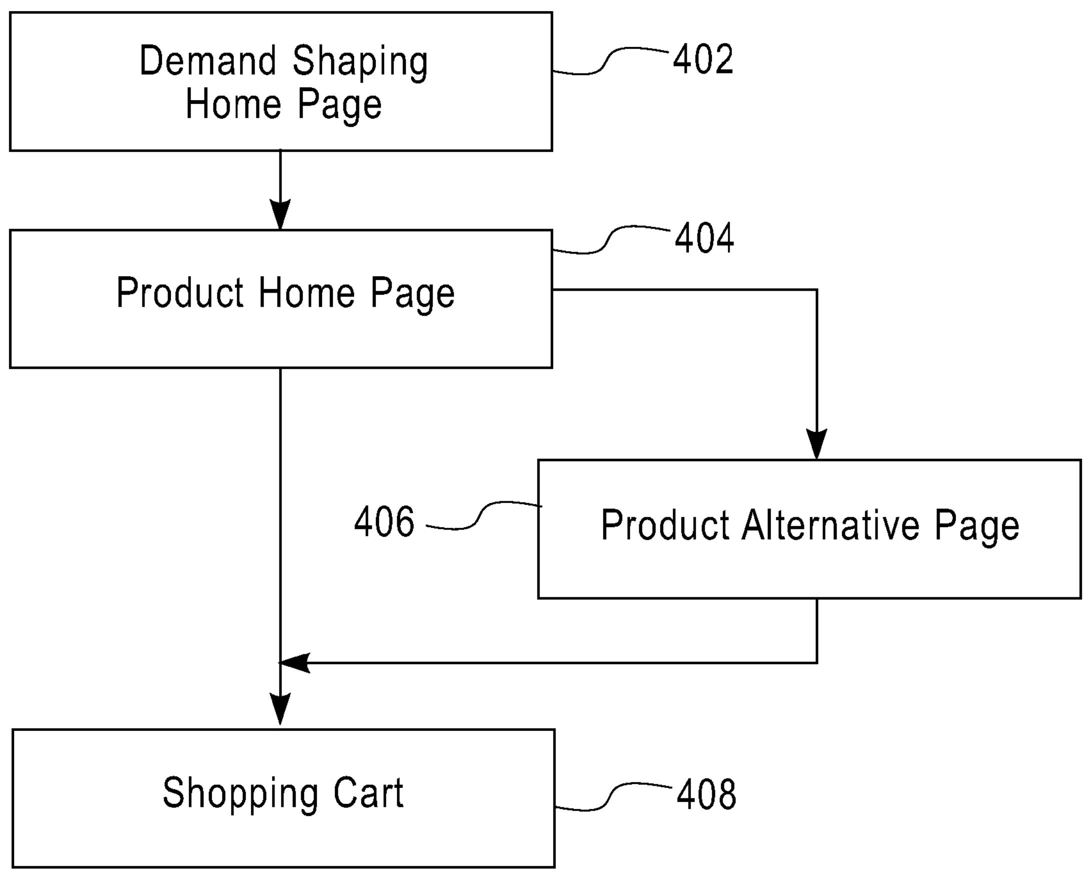
FIG. 4 illustrates a user interface flow for dynamic demand shaping in one embodiment.

FIG. 4 illustrates one embodiment of a user interface flow for dynamic demand shaping. At 402, a home page for starting the dynamic demand shaping may be presented. The home page may be Web enabled HTML interface, or provided via other graphical user interface software or like. At 404, a product home page may be presented, for instance, in response to a customer selecting a particular product of interest or to order. The customer may be given an option to view alternative products, for example via an action button on the product home page. If activated, the screen navigation may lead to a product alternative page 406. The screen flow may invoke a demand shaping algorithm, for example, shown in FIG. 2 and described in FIG. 3, that generates a list of a plurality of substitute products 214. The product alternative page may also display a propensity graph, for example, shown in FIG. 5. At 406, a product alternative detail is presented that may present information such the bills-of-material, sales prices, and quality scores of each substitute product. The product detail page may also comprise availability lead times for each substitute product. The product detail page may also include a component-based comparison of each substitute product and the customer's initial product of interest. Customers then may select one or more of the substitute products presented via the product alternative page. At 408, the customer selected product is placed in an electronic shopping cart.

Figure 5:
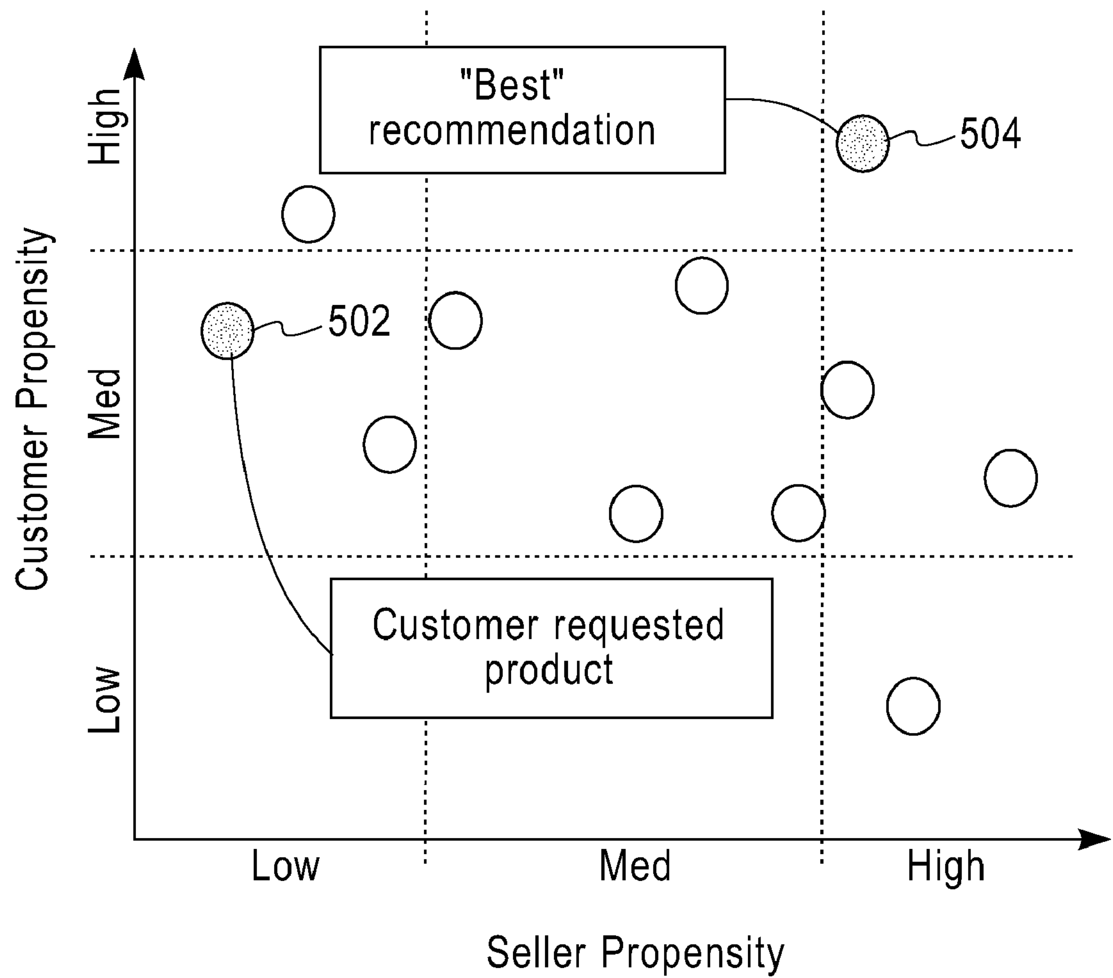
FIG. 5 illustrates a visualization that presents results of dynamic demand shaping in one embodiment.

In another aspect, visualization graphics may illustrate the results in an easily viewable and comprehensible form. FIG. 5 illustrates a visualization that presents dynamic demand shaping results in one embodiment. A propensity graphs shows customer's propensity and seller's propensity for a customer chosen product 502 and substitute products (shown as circles) plotted in a 2-dimensional graph. The X-axis represents the seller propensity, and the Y-axis represents the customer's propensity. The propensity graph visualizes trade-offs between customer and seller propensities and enables selection of suitable sales recommendation considering both customer and seller perspectives. As described above, customer propensity may be determined based on availability/lead time, price, specific component preference and other metrics associated with a substitute product. Seller propensity may be determined based on excess or shortage of a substitute product or components needed for the substitute product, seller's revenue, customer satisfaction and/or service level agreements, and other metrics associated with a substitute product. Based on the computations that consider the above and other various factors, the propensity graph example shows that substitute product at 504 would be the "best" recommendation. Such "best" selection is easily visualized using the graph, which shows the top right corner or quadrant of the graph signaling both "high" propensities for customer and seller.

The two propensity scores (customer propensity and seller propensity) may be used to rank the products. For instance, the customers can be segmented into three groups based on their value to the seller: high value customers, moderate value customers and low value customers. For high value customers, sorting the substitute products in the descending order of their customer propensity scores provides a ranking. For low value customers, sorting the substitute products in the descending order of their seller propensity scores provides a ranking. For moderate value customers, computing an integrated propensity score for each substitute product by taking the average of their customer propensity score and seller propensity score and sorting the substitute products in the descending order of their integrated propensity scores provides a ranking.

The two propensity scores may be used in other ways to rank the products. For instance, customers may be categorized by loyalty to the sellers and the propensity scores used differently based on the category of loyalty. In another aspect, there may be no customer categorization, but only rankings of the propensity scores.

Outputs of the dynamic demand system may be also presented via dashboard, web pages, data files, etc.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some “functionality”, which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for evaluating product substitutions along multiple criteria in response to a sales opportunity, comprising:

determining a customer propensity to estimate attractiveness of a substitute product to a customer based on one or more first attributes;

determining a seller propensity to estimate attractiveness to a seller of selling the substitute product based on one or more second attributes; and combining, by a processor, the customer propensity and the seller propensity to find a plurality of substitute products, the customer propensity determined as a combination of at least: a value representing a price difference between an initial customer choice and a substitute product, a penalty value that penalizes a choice of a component that has a lower quality than that chosen by the customer in a same commodity group, and a penalty value that penalizes choosing a component in the substitute product that is not in the customer’s initial choice and that penalizes a component in the customer’s initial choice that is absent in the substitute.

2. The method of claim 1, wherein said steps of determining a customer propensity and determining a seller propensity are performed for each of a plurality of candidate substitute products.

3. The method of claim 2, wherein said step of combining includes finding the a list of a plurality of substitute products from said plurality of candidate substitute products using associated customer propensity and seller propensity of each of said plurality of candidate substitute products.

4. The method of claim 3, further including:

receiving a selected product from a customer; and generating a list of a plurality of candidate substitute products.

5. The method of claim 1, wherein said one or more first attributes include availability, lead time, price, bill of materials, utility of configuration, green factor associated with the substitute product, or combinations thereof.

6. The method of claim 1, wherein said one or more second attributes include profitability, supply and demand balance, serviceability, green factor associated with the substitute product, or combinations thereof.

7. The method of claim 1, wherein the customer propensity is determined as a function of customer-weightings on each of said one or more first attributes.

8. The method of claim 7, wherein the customer-weightings are estimated based on customer segment or one or more marketing criteria, or combinations thereof.

9. The method of claim 1, further including:

presenting one or more of said substitute products in a visualization graph.

10. A system for evaluating product substitutions along multiple criteria in response to a sales opportunity, comprising:

a data storage module operable to store at least product data, customer propensity attributes and weights, and seller propensity attributes and weights; and a processing engine module operable to determine customer propensity and seller propensity, and propensity rankings associated with each of a plurality of products, the processing engine module further operable to generate one or more substitute product recommendations based on both the determined customer propensity and the seller propensity, the customer propensity determined as a combination of at least: a value representing a price difference between an initial customer choice and a substitute product, a penalty value that penalizes a choice of a component that has a lower quality than that chosen by the customer in a same commodity group, and a penalty value that penalizes choosing a component in the substitute product that is not in the customer’s initial choice and that penalizes a component in the customer’s initial choice that is absent in the substitute.

11. The system of claim 10, wherein said each of a plurality of products is a candidate substitute products for a customer selected product.

12. The system of claim 10, wherein said product data includes a list of sellable product configurations, bill of material that describe one or more components that make up a product, price, availability associated with a product, supply and demand propensity, or profitability associated with a product, or combinations thereof.

13. The system of claim 10, wherein said customer propensity attributes and weights include customer propensity on price, customer propensity on availability, customer propensity on product quality, and weights.

14. The system of claim 10, further including:

a user interface module operable to present said one or more substitute product recommendations.

15. The system of claim 14, wherein said user interface module presents a graphical visualization identifying said one or more substitute product recommendations.

16. A program storage device readable by a machine, tangibly embodying a program of instructions executable by the machine to perform a method for evaluating substitute product recommendations along multiple criteria in response to a sales opportunity, comprising:

determining a customer propensity to estimate attractiveness of a substitute product to a customer based on one or more first attributes;

determining a seller propensity to estimate attractiveness to a seller of selling the substitute product based on one or more second attributes; and combining the customer propensity and the seller propensity to find a plurality of substitute products, the customer propensity determined as a combination of at least: a value representing a price difference between an initial customer choice and a substitute product, a penalty value that penalizes a choice of a component that has a lower quality than that chosen by the customer in a same commodity group, and a penalty value that penalizes choosing a component in the substitute product that is not in the customer's initial choice and that penalizes a component in the customer's initial choice that is absent in the substitute.

17. The program storage device of claim 16, wherein said steps of determining a customer propensity and determining a seller propensity are performed for each of a plurality of candidate substitute products.

18. The program storage device of claim 17, wherein said step of combining includes finding a plurality of substitute products from said plurality of candidate substitute products using associated customer propensity and seller propensity of each of said plurality of candidate substitute products.

19. The program storage device of claim 18, further including:

receiving a selected product from a customer; and generating a list of a plurality of candidate substitute products.

20. The program storage device of claim 16, wherein said one or more first attributes include availability, lead time, price, utility of configuration, green factor associated with the substitute product, or combinations thereof, and said one or more second attributes include profitability, supply and demand balance, serviceability, green factor associated with the substitute product, or combinations thereof.

* * * * *